(12) United States Patent
Subramanian et al.

(10) Patent No.: US 10,547,041 B2
(45) Date of Patent: Jan. 28, 2020

(54) BATTERY PACK ARRAY FRAME DESIGNS WITH RATCHETING RETENTION FEATURES

(71) Applicant: FORD GLOBAL TECHNOLOGIES, LLC, Dearborn, MI (US)

(72) Inventors: Rajaram Subramanian, Ann Arbor, MI (US); Saravanan Paramasivam, South Lyon, MI (US); Mladen Marjanovic, Windsor (CA); Kimberley King, Northville, MI (US); Steve Droste, Ypsilanti, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/652,772

(22) Filed: Jul. 18, 2017

(65) Prior Publication Data
US 2019/0027722 A1    Jan. 24, 2019

(51) Int. Cl.
*H01M 2/10*    (2006.01)
(52) U.S. Cl.
CPC ....... *H01M 2/1094* (2013.01); *H01M 2/1077* (2013.01); *H01M 2220/20* (2013.01)
(58) Field of Classification Search
CPC ....... H01M 2/10; H01M 2/1077; H01M 10/60
See application file for complete search history.

(56) References Cited

U.S. PATENT DOCUMENTS

| | | | |
|---|---|---|---|
| 9,508,966 B2 | 11/2016 | Gunna et al. | |
| 2006/0093890 A1* | 5/2006 | Steinbroner | H01M 8/248 429/430 |
| 2012/0107659 A1 | 5/2012 | Phlegm et al. | |
| 2013/0108902 A1 | 5/2013 | Kristofek et al. | |
| 2013/0164578 A1* | 6/2013 | Sweet | H01M 10/0413 429/82 |
| 2016/0093849 A1 | 3/2016 | DeKeuster et al. | |
| 2016/0309624 A1 | 10/2016 | Lei et al. | |

FOREIGN PATENT DOCUMENTS

| | | |
|---|---|---|
| EP | 1530247 A2 | 5/2005 |
| WO | WO2014024432 A1 | 2/2014 |

OTHER PUBLICATIONS

"Bolt." Merriam-Webster.com. Retrieved Jul. 18, 2019. www.merriam-webster.com/dictionary/bolt. (Year: 2019).*

* cited by examiner

*Primary Examiner* — James Lee
(74) *Attorney, Agent, or Firm* — David B. Kelley; Carlson, Gaskey & Olds

(57) ABSTRACT

A battery pack includes a grouping of battery cells and a plurality of array frames for retaining the grouping of battery cells. Each of the plurality of array frames includes a ratchet feature. A column bolt includes a raised surface configured to mate with the ratchet feature of each of the plurality of array frames to secure the plurality of array frames together.

16 Claims, 5 Drawing Sheets

BATTERY PACK ARRAY FRAME DESIGNS WITH RATCHETING RETENTION FEATURES

TECHNICAL FIELD

This disclosure relates to battery packs for electrified vehicles. An exemplary battery pack includes an array frame for retaining at least one battery cell. The array frame includes a ratchet feature for mating with a column bolt.

BACKGROUND

The desire to reduce automotive fuel consumption and emissions is well documented. Therefore, vehicles are being developed that reduce or completely eliminate reliance on internal combustion engines. Electrified vehicles are currently being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines and other electrical loads of the electrified vehicle. The battery pack includes a plurality of battery cells that store energy for powering these electrical loads. The battery cells are often packaged together in one or more assemblies using various support structures such as frames, fasteners, bolts, rods, spacers, rails, walls, plates, bindings, etc. These support structures may not apply consistent clamping forces on the battery cells, thereby resulting in inconsistent cell stack dimensions and packaging challenges.

SUMMARY

A battery pack according to an exemplary aspect of the present disclosure includes, among other things, a grouping of battery cells and a plurality of array frames for retaining the grouping of battery cells. Each of the plurality of array frames includes a ratchet feature. A column bolt includes a raised surface configured to mate with the ratchet feature of each of the plurality of array frames to secure the plurality of array frames together.

In a further non-limiting embodiment of the foregoing battery pack, each of the plurality of array frames includes a top wall, a bottom wall, and frame arms that extend between the top wall and the bottom wall.

In a further non-limiting embodiment of either of the foregoing battery packs, a fastening band is formed at a junction between the top wall or the bottom wall and one of the frame arms.

In a further non-limiting embodiment of any of the foregoing battery packs, the fastening band includes a side opening for receiving the column bolt.

In a further non-limiting embodiment of any of the foregoing battery packs, a first fastening band is formed at a junction between the top wall and one of the frame arms and a second fastening band formed at a junction between the bottom wall and the one of the frame arms.

In a further non-limiting embodiment of any of the foregoing battery packs, each of the plurality of array frames includes a fastening band having a side opening for receiving the column bolt.

In a further non-limiting embodiment of any of the foregoing battery packs, the ratchet feature is established by a protruding wall of a fastening band of at least one of the plurality of array frames.

In a further non-limiting embodiment of any of the foregoing battery packs, the protruding wall includes a first lip that extends from an upper ledge of the fastening band and a second lip that extends from a lower ledge of the fastening band.

In a further non-limiting embodiment of any of the foregoing battery packs, a curved surface connects between the first lip and the second lip.

In a further non-limiting embodiment of any of the foregoing battery packs, the first lip and the second lip abut against the raised surface of the column bolt to restrict movement of the plurality of array frames relative to the column bolt.

In a further non-limiting embodiment of any of the foregoing battery packs, the grouping of battery cells and the plurality of array frames establish a battery assembly.

In a further non-limiting embodiment of any of the foregoing battery packs, opposing end plates are positioned at longitudinal extents of the battery assembly.

In a further non-limiting embodiment of any of the foregoing battery packs, the column bolt extends through an opening of each of the opposing end plates.

In a further non-limiting embodiment of any of the foregoing battery packs, the ratchet feature includes a lip that abuts against the raised surface to restrict movement of the plurality of array frames relative to the column bolt.

In a further non-limiting embodiment of any of the foregoing battery packs, the raised surface protrudes radially outwardly from a shaft of the column bolt.

A method according to another exemplary aspect of the present disclosure includes, among other things, securing together a plurality of array frames of a battery assembly using a column bolt. The plurality of array frames include a ratchet feature that interfaces with a raised surface of the column bolt to restrict movement of the plurality of array frames relative to the column bolt.

In a further non-limiting embodiment of the foregoing method, the method includes inserting the column bolt into a side opening of a fastening band of the plurality of array frames.

In a further non-limiting embodiment of either of the foregoing methods, the method includes moving the plurality of array frames along a shaft of the column bolt until the ratchet feature abuts the raised surface of the column bolt.

In a further non-limiting embodiment of any of the foregoing methods, the ratchet feature includes a first lip and a second lip that abut against the raised surface to restrict the movement.

In a further non-limiting embodiment of any of the foregoing methods, the method includes inserting the column bolt through an opening of an end plate of the battery assembly.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details various battery pack designs for use within electrified vehicles. An exemplary battery pack includes a grouping of battery cells retained in a cell stack by a plurality of interconnected array frames. Each array frame may include a ratchet feature configured to mate with a raised surface of a column bolt to secure the plurality of array frames together. The array frame/column bolt interface locks the array frames in position and restricts relative movement of the array frames relative to the column bolt. These and other features are discussed in greater detail in the following paragraphs of this detailed description.

Figure 1:
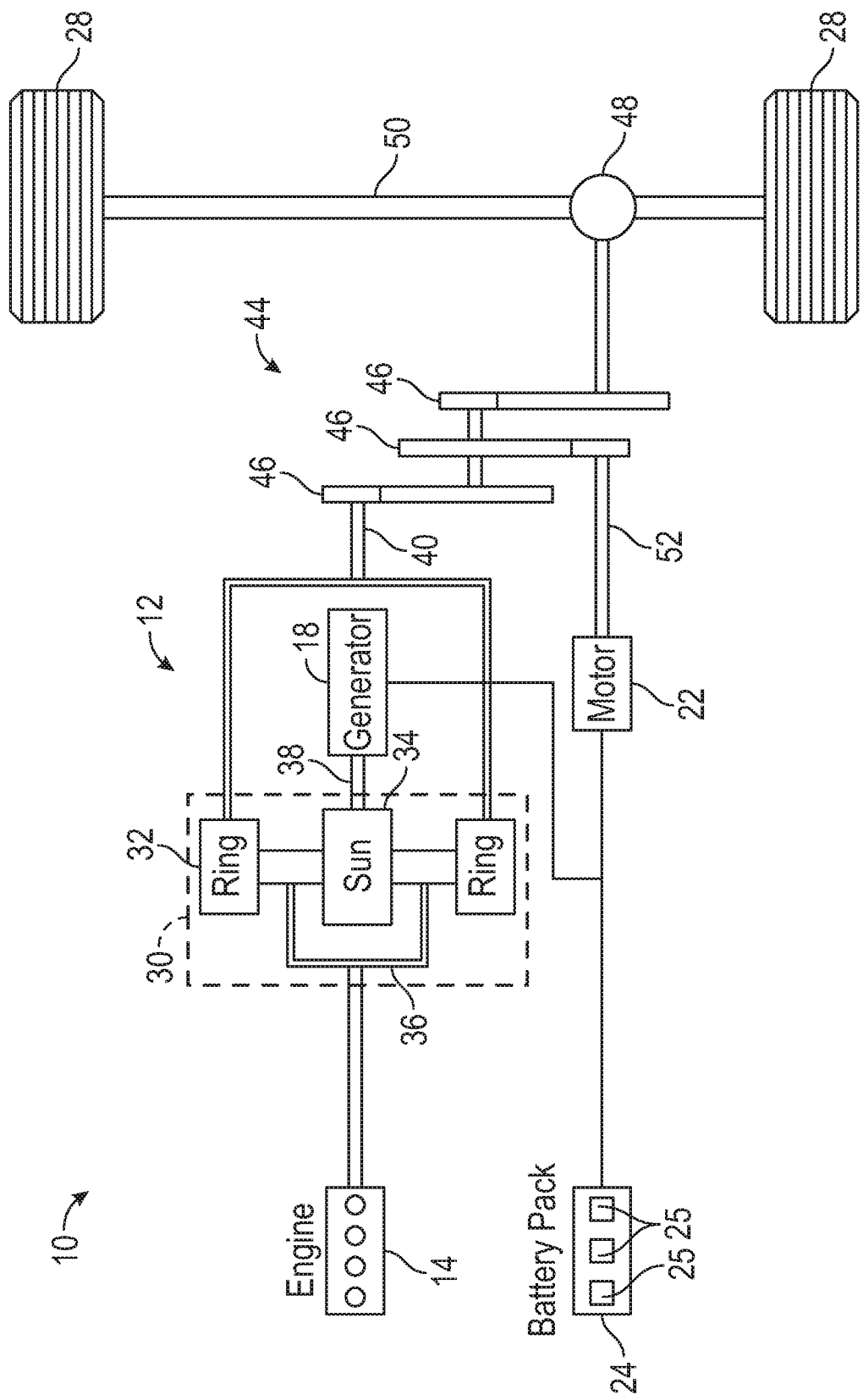
FIG. 1 schematically illustrates a powertrain of an electrified vehicle.

FIG. 1 schematically illustrates a powertrain 10 for an electrified vehicle 12. Although depicted as a hybrid electric vehicle (HEV), it should be understood that the concepts described herein are not limited to HEV's and could extend to other electrified vehicles, including, but not limited to, plug-in hybrid electric vehicles (PHEV's), battery electric vehicles (BEV's), fuel cell vehicles, etc.

In a non-limiting embodiment, the powertrain 10 is a power-split powertrain system that employs first and second drive systems. The first drive system includes a combination of an engine 14 and a generator 18 (i.e., a first electric machine). The second drive system includes at least a motor 22 (i.e., a second electric machine), the generator 18, and a battery pack 24. In this example, the second drive system is considered an electric drive system of the powertrain 10. The first and second drive systems are each capable of generating torque to drive one or more sets of vehicle drive wheels 28 of the electrified vehicle 12. Although a power-split configuration is depicted in FIG. 1, this disclosure extends to any hybrid or electric vehicle including full hybrids, parallel hybrids, series hybrids, mild hybrids or micro hybrids.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In a non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In a non-limiting embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In a non-limiting embodiment, the motor 22 and the generator 18 cooperate as part of a regenerative braking system in which both the motor 22 and the generator 18 can be employed as motors to output torque. For example, the motor 22 and the generator 18 can each output electrical power to the battery pack 24.

The battery pack 24 is an exemplary electrified vehicle battery. The battery pack 24 may be a high voltage traction battery pack that includes a plurality of battery assemblies 25 (i.e., battery arrays or groupings of battery cells) capable of outputting electrical power to operate the motor 22, the generator 18, and/or other electrical loads of the electrified vehicle 12. Other types of energy storage devices and/or output devices could also be used to electrically power the electrified vehicle 12.

In a non-limiting embodiment, the electrified vehicle 12 has two basic operating modes. The electrified vehicle 12 may operate in an Electric Vehicle (EV) mode where the motor 22 is used (generally without assistance from the engine 14) for vehicle propulsion, thereby depleting the battery pack 24 state of charge up to its maximum allowable discharging rate under certain driving patterns/cycles. The EV mode is an example of a charge depleting mode of operation for the electrified vehicle 12. During EV mode, the state of charge of the battery pack 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery pack 24 at a constant or approximately constant level by increasing the engine 14 propulsion. The electrified vehicle 12 may be operated in other operating modes in addition to the EV and HEV modes within the scope of this disclosure.

Figure 2:
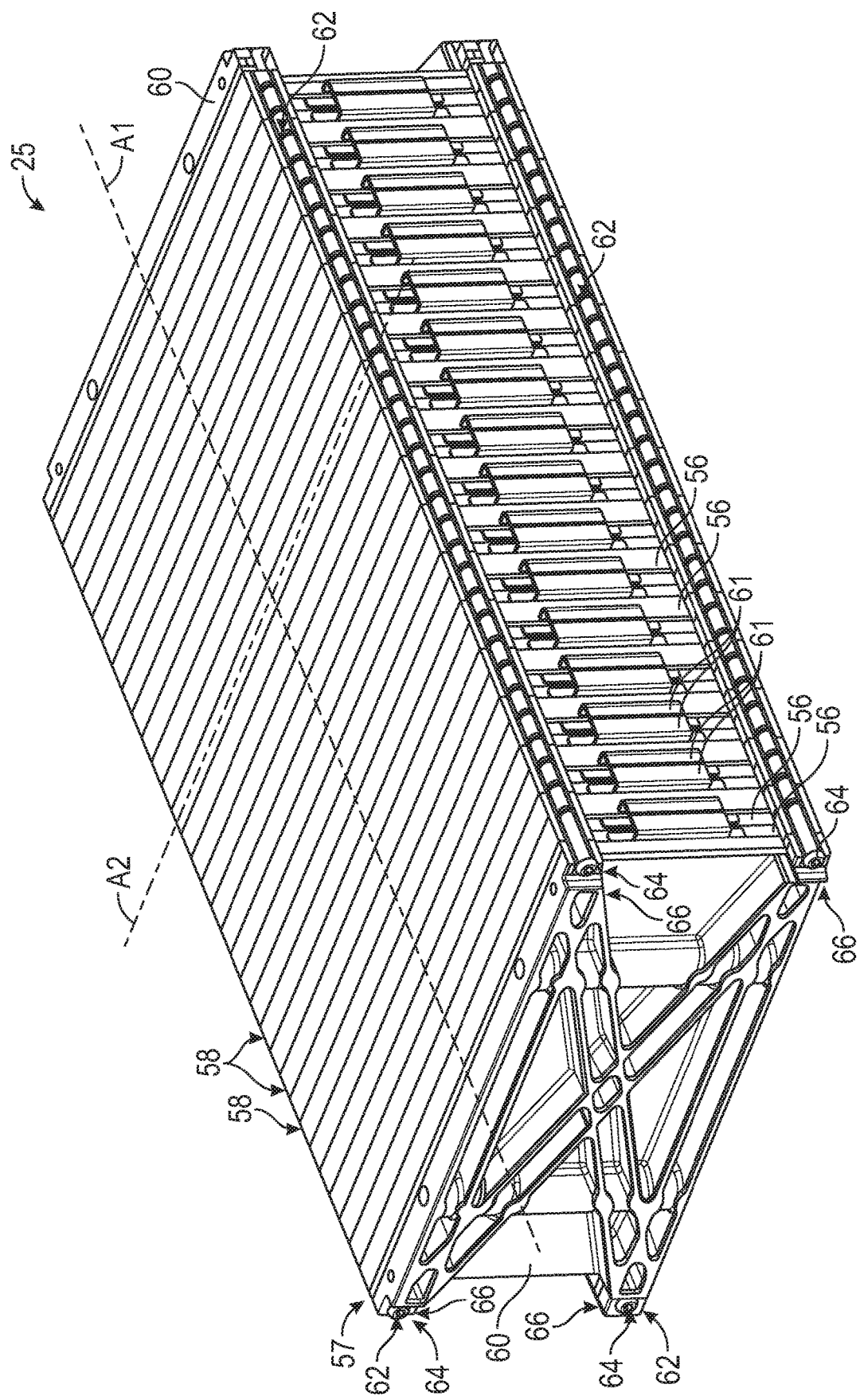
FIG. 2 illustrates a battery assembly for an electrified vehicle battery pack.
Figure 3:
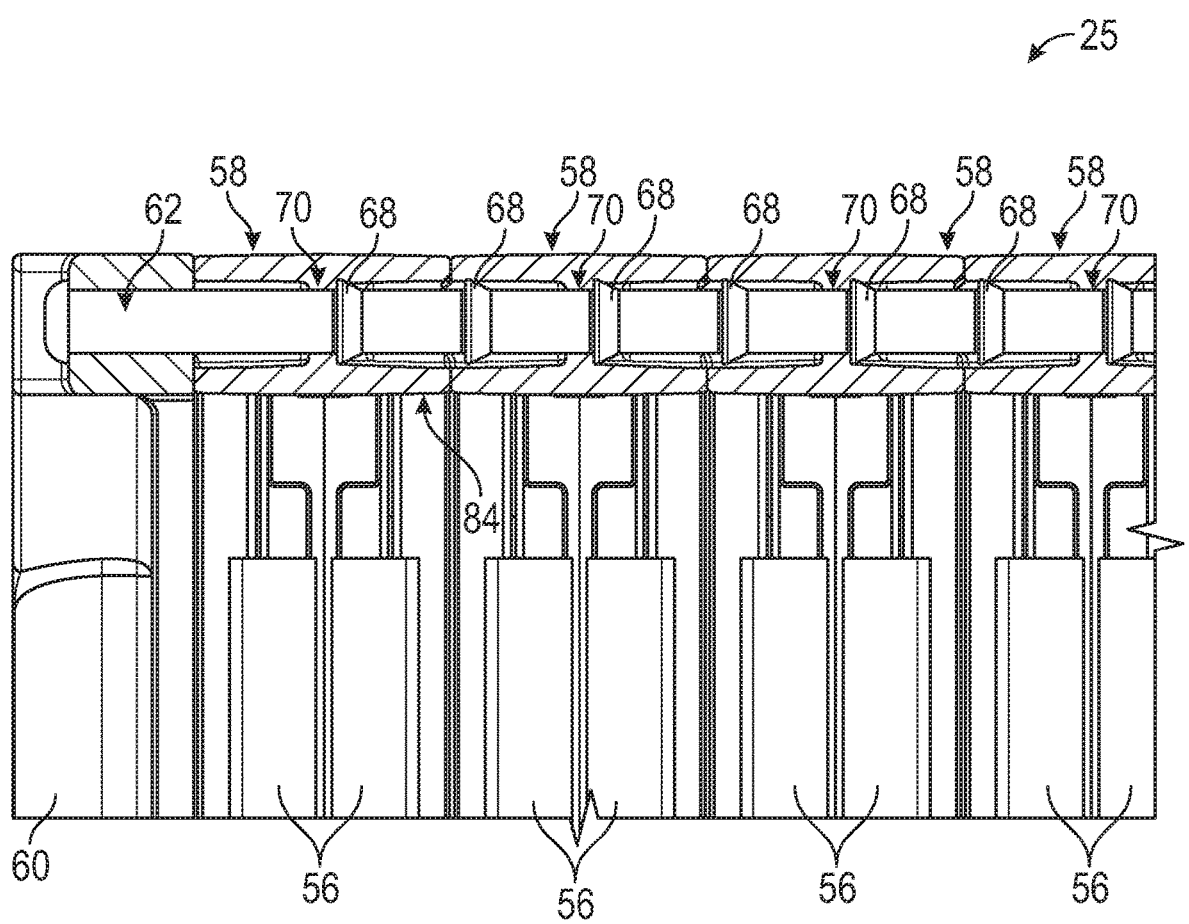
FIG. 3 is a blown up view of a portion of the battery assembly of FIG. 2.

FIGS. 2 and 3 schematically illustrates a battery assembly 25 that can be employed within an electrified vehicle. For example, the battery assembly 25 could be a component of the battery pack 24 of the electrified vehicle 12 of FIG. 1. The battery assembly 25 includes a plurality of battery cells 56 that store energy for powering various electrical loads of the electrified vehicle 12. Although a specific number of battery cells 56 are depicted in FIG. 2, the battery assembly 25 could employ a greater or fewer number of cells within the scope of this disclosure. In other words, this disclosure is not limited to the specific configuration shown in FIG. 2.

The battery cells 56 may be stacked side-by-side to construct a grouping of battery cells 56, sometimes referred to as a "cell stack." In an embodiment, the battery cells 56 are lithium-ion pouch cells. However, battery cells having other geometries (cylindrical, prismatic, etc.), other chemistries (nickel-metal hydride, lead-acid, etc.), or both could alternatively be utilized within the scope of this disclosure.

The battery cells 56, along with any support structures (e.g., array frames, spacers, rails, walls, plates, bindings, etc.), may collectively be referred to as the battery assembly 25. In an embodiment, the battery cells 56 of the battery assembly 25 are supported, held, and/or retained together by a support structure 57 disposed around an outer perimeter of the cell stack. The support structure 57 may include a plurality of interconnected array frames 58 and opposing end plates 60. The array frames 58 are stacked side-by-side, assembled together, and positioned between the opposing end plates 60, which are positioned at the longitudinal extents of the battery assembly 25. Therefore, the battery assembly 25 extends along a longitudinal axis A1 between the opposing end plates 60. The array frames 58 each extend along a longitudinal axis A2 that is generally transverse to the longitudinal axis A1.

Terminals 61 of the battery cells 56 protrude laterally outwardly of the array frames 58 once the battery cells 56 have been positioned within the array frames 58. For example, the terminals 61 may be positioned to extend in parallel with the longitudinal axis A2 at the sides of the battery assembly 25.

The support structure 57 may additionally include one or more column bolts 62 for axially constraining the battery assembly 25. In an embodiment, the support structure 57 includes four column bolts 62 that extend longitudinally between the opposing end plates 60, with one column bolt 62 positioned at the top and bottom of each side of the battery assembly 25. However, a greater or fewer number of column bolts could be employed by the battery assembly 25 within the scope of this disclosure. The column bolts 62 may generally extend in parallel with the longitudinal axis A1 of the battery assembly 25.

In another embodiment, the column bolts 62 extend through openings 64 formed near each corner 66 of the end plates 60. The column bolts 62 are connectable to each array frame 58 of the battery assembly 25. The column bolts 62 lock the positioning of the array frames 58 relative to one another to assemble the battery assembly 25 as a homogenous unit. In an embodiment, as best shown in FIG. 3, the column bolts 62 include raised surfaces 68 that mate with (i.e., interface with) ratchet features 70 of each array frame 58 to provide a "zip-tie" effect during the assembly of the battery assembly 25. As discussed in greater detail below, the novel "zip-tie" design provided by array frame 58/column bolt 62 interface locks the array frames in position and restricts relative movement of the array frames 58 relative to the column bolt 62.

Figure 4:
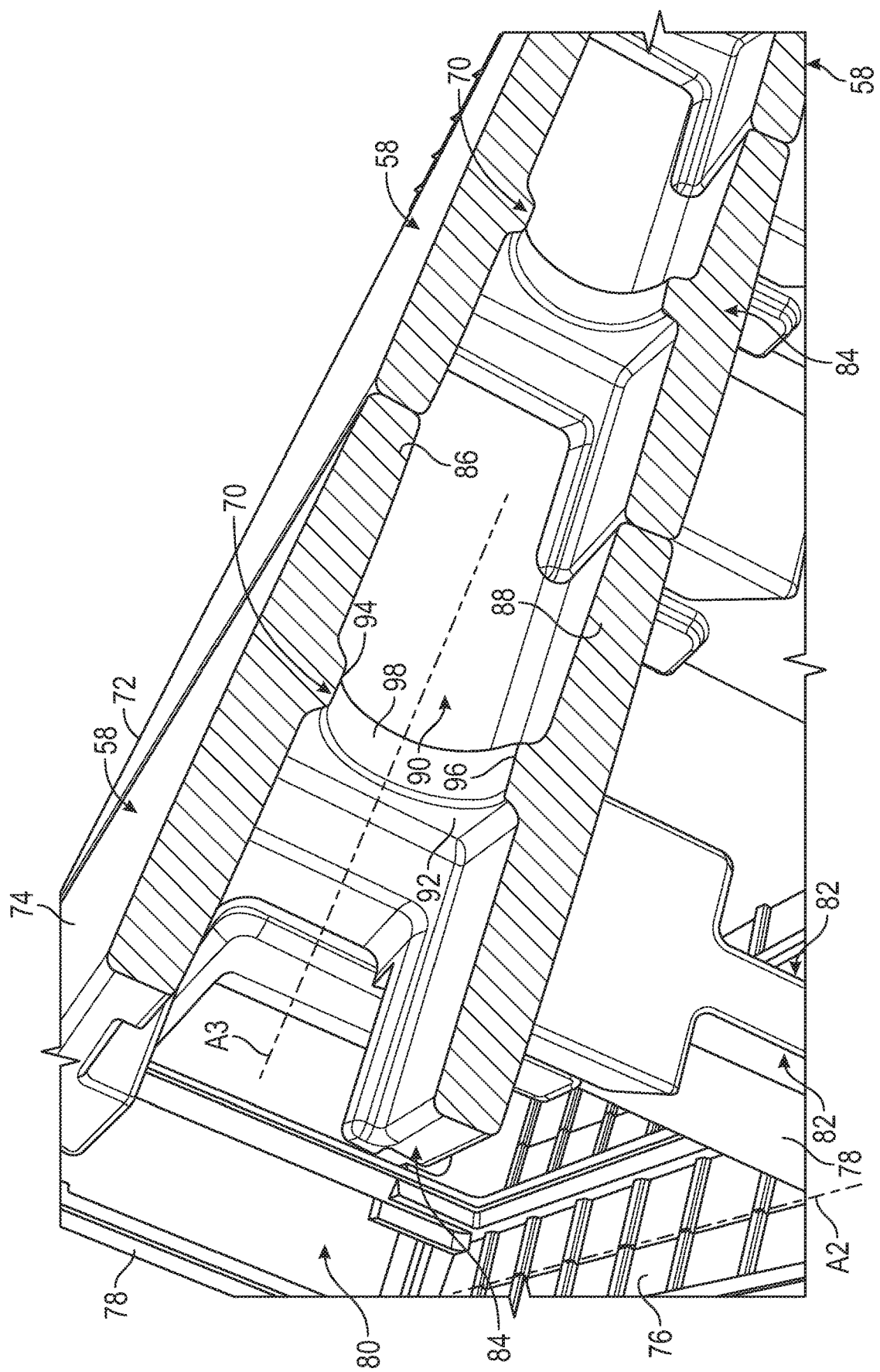
FIG. 4 is a sectional view through a plurality of interconnected array frames of a battery assembly.

FIG. 4 illustrates a plurality of interconnected array frames 58 of the battery assembly 25 of FIG. 2. The array frames 58 of FIG. 4 are shown with the battery cells 56 and the column bolts 62 removed to better illustrate the ratchet features 70 and various other structures of the array frames 58.

Each array frame 58 includes a frame body 72 disposed along the longitudinal axis A2 (see FIG. 2). The frame body 72 may be rectangular shaped (i.e., four sided) and includes a top wall 74, a bottom wall 76, and frame arms 78 that connect between the top wall 74 and the bottom wall 76. In an embodiment, the frame arms 78 are disposed near opposing ends (i.e., near the longitudinal extents) of the top wall 74 and the bottom wall 76. The top wall 74, the bottom wall 76, and the frame arms 78 establish a perimeter around an opening 80 formed through the frame body 72. In an embodiment, the top wall 74 and the bottom wall extend horizontally and in parallel with the longitudinal axis A2 of the frame body 72, and the frame arms 78 extend vertically and transverse to the longitudinal axis A2.

The frame body 72 of the array frame 58 may be a unitary, plastic structure. In an embodiment, the top wall 74, the bottom wall 76, and the frame arms 78 are molded, cast, machined or otherwise manufactured to form the unitary, monolithic structure.

Each opposing side of the frame body 72 may establish a pocket 82 that is sized and shaped to receive a battery cell (see feature 56 of FIG. 3, for example). Each array frame 58 may house either one or two battery cells, with each pocket 82 being capable of receiving a single battery cell 56.

Each array frame 58 may additionally include one or more fastening bands 84 for accommodating the column bolts 62. The fastening bands 84 are integrated features of the frame body 72 of the array frame 58. The fastening bands 84 may protrude from the frame arms 78 in a direction away from the opening 80 of the frame body 72. In an embodiment, the fastening bands 84 are disposed at both ends of each frame arm 78 (e.g., near a junction between each frame arm 78 and the top wall 74 and near the junction between each frame arm 78 and the bottom wall 76). The fastening bands 84 extending near the top wall 74 may be referred to as upper fastening bands, whereas the fastening bands 84 extending near the bottom wall 76 may be referred to as lower fastening bands.

Each fastening band 84 includes an upper ledge 86 and a lower ledge 88. A side opening 90 extends between the upper ledge 86 and the lower ledge 88 along a longitudinal axis A3 that is generally parallel to the longitudinal axis A1 of the battery assembly 25 (see FIG. 2). The side opening 90 is sized and shaped to accommodate one of the column bolts 62 (see, e.g., FIGS. 2 and 5).

The fastening bands 84 establish the ratchet features 70 of the array frames 58. In an embodiment, each ratchet feature 70 is provided by a protruding wall 92 that protrudes inwardly from both the upper ledge 86 and the lower ledge 88 of the fastening band 84. The protruding wall 92 may include a first lip 94 extending inwardly from the upper ledge 86, a second lip 96 extending inwardly from the lower ledge 88, and a curved surface 98 connecting between the first lip 94 and the second lip 96.

Figure 5:
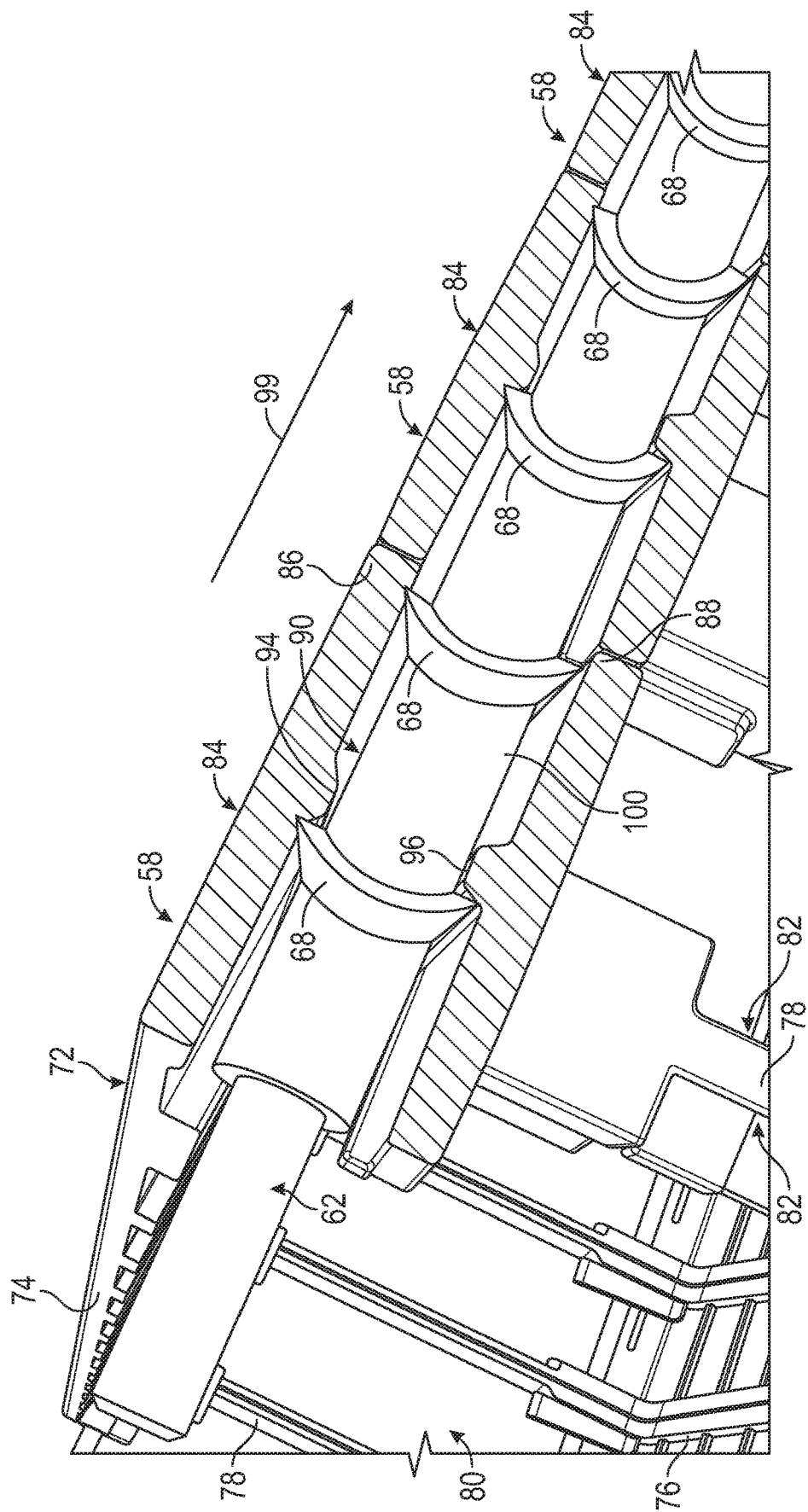
FIG. 5 is another sectional view depicting a connection between a column bolt and the plurality of interconnected array frames of FIG. 4.

Referring now to FIGS. 4 and 5, the raised surfaces 68 of the column bolt 62 extend radially outwardly from a shaft 100. The curved surface 98 of the protruding wall 92 accommodates the shaft 100 of the column bolt 62 once the column bolt 62 is inserted into the side opening 90 of the fastening band 84. In an embodiment, the shaft 100 of the column bolt 62 is hollow to reduce weight.

The column bolt 62 may be positioned within the side opening 90 of the fastening band 84. The array frames 58 may then be pushed in a direction of arrow 99 to assemble the battery assembly 25. Moving the array frames 58 in the direction of arrow 99 will cause the first lip 94 and the second lip 96 of the protruding wall 92 to abut against the raised surface 68 of the column bolt 62, thus creating the "zip-tie" effect and restricting relative movement between the array frames 58 and the column bolt 62. Once the end plates 60 are added (see FIG. 2), the column bolts 62 effectively apply a compressive locking force across the plurality of array frames 58.

The array frame/column bolt ratcheting mating features described by this disclosure improve module functionality by locking movement of the frames relative to the bolt, thereby improving battery assembly robustness with no additional parts. Relative separation of the frames and end plates is therefore substantially reduced which may result in improved vibration characteristics and increased durability.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
a grouping of battery cells;
a plurality of array frames for retaining the grouping of battery cells, wherein each of the plurality of array frames includes a ratchet feature; and
a column bolt including a raised surface configured to mate with the ratchet feature of each of the plurality of array frames to secure the plurality of array frames together,
wherein each of the plurality of array frames includes a fastening band that includes the ratchet feature, and the fastening bands of adjacent array frames of the plurality of array frames abut one another to establish a side opening for receiving the column bolt.

2. The battery pack as recited in claim 1, wherein each of the plurality of array frames includes a top wall, a bottom wall, and frame arms that extend between the top wall and the bottom wall.

3. The battery pack as recited in claim 2, wherein the fastening band is formed at a junction between the top wall or the bottom wall and one of the frame arms.

4. The battery pack as recited in claim 2, comprising a first fastening band formed at a junction between the top wall and one of the frame arms and a second fastening band formed at a junction between the bottom wall and the one of the frame arms.

5. The battery pack as recited in claim 1, wherein the ratchet feature is established by a protruding wall of the fastening band of at least one of the plurality of array frames.

6. The battery pack as recited in claim 5, wherein the protruding wall includes a first lip that extends from an upper ledge of the fastening band and a second lip that extends from a lower ledge of the fastening band.

7. The battery pack as recited in claim 6, comprising a curved surface that connects between the first lip and the second lip.

8. The battery pack as recited in claim 6, wherein the first lip and the second lip abut against the raised surface of the column bolt to restrict movement of the plurality of array frames relative to the column bolt.

9. The battery pack as recited in claim 1, wherein the grouping of battery cells and the plurality of array frames establish a battery assembly.

10. The battery pack as recited in claim 9, comprising opposing end plates positioned at longitudinal extents of the battery assembly.

11. The battery pack as recited in claim 10, wherein the column bolt extends through an opening of each of the opposing end plates.

12. The battery pack as recited in claim 1, wherein the ratchet feature includes a lip that abuts against the raised surface to restrict movement of the plurality of array frames relative to the column bolt.

13. The battery pack as recited in claim 1, wherein the raised surface protrudes radially outwardly from a shaft of the column bolt.

14. The battery pack as recited in claim 13, wherein the raised surface extends about an entire circumference of the shaft of the column bolt.

15. The battery pack as recited in claim 1, wherein the side opening is unenclosed on a lateral side of the fastening bands, the lateral side facing in a direction away from the grouping of battery cells.

16. A battery pack, comprising:
a grouping of battery cells;
a plurality of array frames for retaining the grouping of battery cells, wherein each of the plurality of array frames includes a ratchet feature; and
a column bolt including a raised surface configured to mate with the ratchet feature of each of the plurality of array frames to secure the plurality of array frames together,
wherein the column bolt includes a hollow shaft.

* * * * *